United States Patent [19]

Loch

[11] Patent Number: 4,794,992
[45] Date of Patent: Jan. 3, 1989

[54] HIGH CENTER SHOVEL

[76] Inventor: George Loch, Box 14, Glendon, Alberta, Canada, T0A 1P0

[21] Appl. No.: 16,588

[22] Filed: Feb. 19, 1987

[30] Foreign Application Priority Data

Feb. 20, 1986 [CA] Canada .................................. 502354

[51] Int. Cl.⁴ ........................ A01B 23/00; A01B 35/24
[52] U.S. Cl. ..................................... 172/721; 172/762
[58] Field of Search ............... 172/721, 765, 770, 707, 172/708, 762, 730, 731, 724, 753, 749

[56] References Cited

U.S. PATENT DOCUMENTS

| 40,414 | 10/1863 | Kelly | 172/721 |
|---|---|---|---|
| 395,573 | 1/1889 | Mallory | 172/724 |
| 708,064 | 9/1902 | McKinnon | 172/762 X |
| 829,562 | 8/1906 | Werth | 172/721 |
| 1,418,173 | 5/1922 | Reynolds | 172/708 |
| 1,511,301 | 10/1924 | Sanders | 172/753 |

FOREIGN PATENT DOCUMENTS

| 207142 | 1/1921 | Canada . | |
| 338790 | 1/1934 | Canada . | |
| 2343410 | 10/1977 | France | 172/770 |

Primary Examiner—Richard J. Johnson
Attorney, Agent, or Firm—Murray E. Thrift; Stanley G. Ade; Adrian D. Battison

[57] ABSTRACT

Standard shovels, particularly shovels used in deep tillage implements, vibra chisel or vibra shank cultivators and the like tend to push or roll the soil ahead in front of the shovel leading to high wear and heavy draft conditions. The present shovel is V-shaped with a relatively high center thus giving a plowing effect and turning the soil over and away upon each side thereof. A substantially centrally located depression is formed when the shovel is pressed out thereby forming a recess on the front side and a flattened bearing surface on the rear side thus providing a good anchoring and bearing area when bolted through the flattened portion and onto the shank. The bolt heads are protected and the invention can be incorporated also on shovels with wings or sweeps on each side of the high center central portion.

16 Claims, 1 Drawing Sheet

HIGH CENTER SHOVEL

BACKGROUND OF THE INVENTION

This invention relates to new and useful improvements in shovels, primarily furrow shovels although it can be used with advantage on standard cultivator shovels with wings or sweeps upon each side thereof.

The present invention is particularly adapted for use with deep tillage implements, vibra chisel or vibra shank cultivators and the like.

Conventionally, such shovels include a flattened or slightly rounded configuration which tends to push the soil ahead thereof and roll it in front of the shovel rather than slicing through the soil with a plow action. This leads to relatively heavy wear occurring and also requires additional power because of the high draft conditions under which said shovels operate.

The present invention overcomes these disadvantages by providing a high centre furrow shovel which is V-shaped in cross sectional configuration with the two flanges extending from a common apex forming an acute angle. This gives a plowing effect so that the soil is divided by the high centre and is turned over on each side of the shovel thus providing a light draft, long lasting, very strong shovel.

SUMMARY OF THE INVENTION

One aspect of the invention therefore is to provide a high centre shovel for use with ground working implements which include shanks or the like for supporting said shovels; said shovel comprising an elongated, V-shaped cross sectional component engageable upon the lower end of a shank, and means to detachably secure said shovel upon said shank. Said means including a bearing surface formed intermediate the ends of said shovel and symmetrically located between the long edges thereof, said bearing surface being engageable upon said shank and bolt means extending through said shovel and said shank, the width of said bearing surface being substantially equal to the width of said shank.

A further aspect of the invention is to provide a high centre shovel comprising an angulated length of steel which includes a pair of side flanges each extending from a common longitudinal apex at an acute angle one with the other, means to detachably secure said shovel to an associated shank, said means including a bearing surface intermediate the outer edges of said flanges and symmetrically located between said outer edges and spanning said apex and bolt apertures extending through said bearing surface, the width of said bearing surface being substantially equal to the width of the associated shank.

Another advantage of the present invention is the provision of the recessed central area forming a bearing area on the rear side of the shovel engageable with the shank to which it may be secured by bolts so that the possibility of relative movement between the shovel and the shank is reduced if not eliminated.

Another advantage of the present invention is to provide an extremely strong, easily formed high centre shovel particularly designed for use in deep tillage conditions and which reduces the draft and wear considerably.

A still further advantage of the invention is to provide a device of the character herewithin described which is simple in construction, economical in manufacture, and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 4:
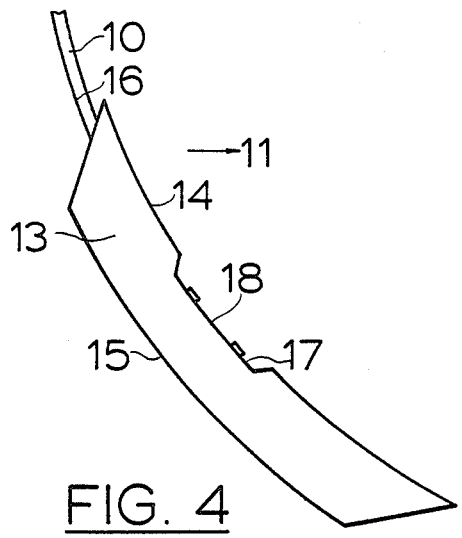
FIG. 4 is a side elevation of FIG. 1.
Figure 6:
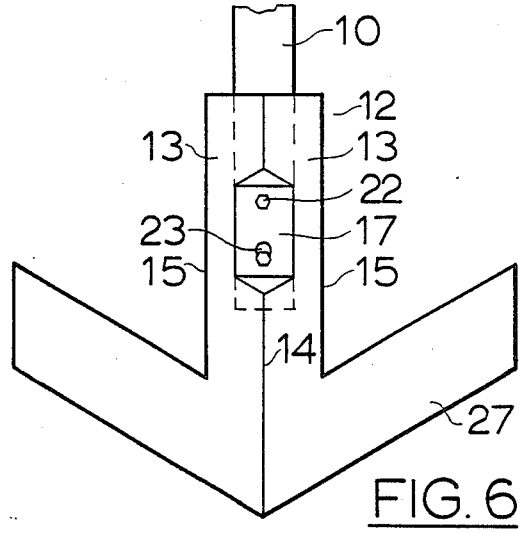
FIG. 6 is a view similar to FIG. 1 but showing a shovel with wings formed on either side thereof.

Proceeding therefore to describe the invention in detail, reference should be made to the accompanying drawings in which 10 illustrates a conventional implement shank usually formed from spring steel and having a rectangular cross sectional configuration wherein the wide dimension faces forwardly in the direction of travel indicated in FIG. 4 by arrow 11.

The shovel collectively designated 12 is formed from good quality steel and may be drop forged or pressed depending upon design and heat treated if necessary.

It consists of an elongated length of steel angulated longitudinally to form a pair of flanges 13 one upon each side of a longitudinally extending apex 14 which forms the high centre of the shovel.

The angulation between the two flanges may of course vary within limits and is preferably aproximately 100° although it may vary from between 80° to 120° depending upon design and draft considerations.

During the formation of the elongated shovel, a slight curvature may be imparted therein as indicated by reference character 15, to suit the curvature of the lower end 16 of the shank to which it is attached. If this portion of the shank is straight, then or course the curvature is not required.

During formation, a substantially centrally located depressed area 17 is formed by depressing the apex 14 intermediate the ends thereof thus forming a planar recess base 18 and a corresponding planar bearing surface 19 within the included angle 20 of the shovel, it being understood that this depression 17 is formed symmetrically along the apex 14. This bearing surface 19 has a width substantially equal to the width of the shank 10 to which it is attached thus giving a secure anchor for the shovel and, in combination with the securing bolts, an attachment which is resistant to relative movement between the shovel 12 and the shank 10.

An aperture 20 is formed through this depressed area 18/19 which may be aligned with an aperture 21 formed through the shank so that a nut and bolt assembly 22 may be engaged therethrough.

Figure 5:
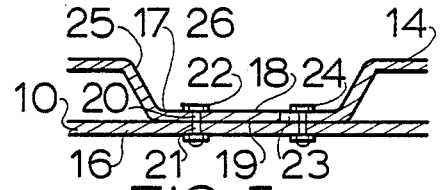
FIG. 5 is an enlarged cross sectional view substantially along the line 5—5 of FIG. 1.

A further aperture 23 is formed through the area 18/19 spaced from the aperture 20 and this aperture is in the form of an elongated slot as clearly shown in FIG. 5. This permits the shovel to be attached to a variety of shanks, the spacing of the bolt apertures often varying from one manufacturer to another thus making the shovel adaptable for use with any make of shank.

Figure 1:
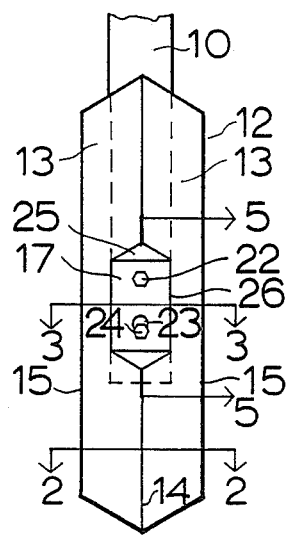
FIG. 1 is a front elevation of the shovel secured to the lower end of an implement shank.
Figure 2:
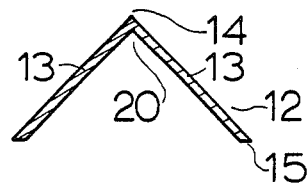
FIG. 2 is an enlarged cross sectional view along the line 2—2 of FIG. 1.
Figure 3:
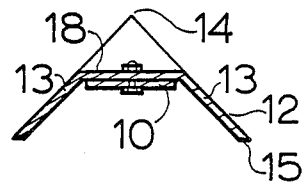
FIG. 3 is an enlarged cross sectional view along the line 3—3 of FIG. 1.

When installed as shown in FIGS. 1 and 5, the bolt heads 24 are recessed and shielded by the end walls 25 of the recess and the side walls 26 thereof thus reducing wear upon the bolt heads.

The high centre shovel 12 may therefore be used in order to provide reduced draft and along wearing characteristics to the implement.

If desired, wings or sweeps 27 may be formed on either side of the elongated shovel 12 still retaining the advantages of the high centre shovel construction and including the improved attachment to the shank 10.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A high centre shovel for use with ground working implements which include shanks or the like for supporting said shovels; said shovel comprising two elongated flanges diverging rearwardly from a common longitudinal apex and defining a V-shaped cross section with an unconstricted open rear side, the shovel being engageable upon the lower end of a shank, and means to detachably secure said shovel upon said shank, said means including a recessed bearing section located along the apex, intermediate the ends of said shovel and symmetrically located between the long edges thereof, said bearing section having a substantially flat bearing surface on the back side thereof, engageable upon said shank, and bolt means extending through said shovel and said shank, the width of said bearing surface being substantially equal to the width of said shank.

2. The shovel according to claim 1 in which said bearing section includes a corresponding recessed flat front surface upon the front side of said shovel.

3. The shovel according to claim 2 which includes a central area of said shovel being depressed during the forming thereof, the front side of said central area forming said flat front surface, the back side of said central area forming said bearing surface.

4. The shovel according to claim 1 in which said bolt means includes at least one fixed location bolt aperture through said bearing section and at least one elongaged bolt aperture formed through said bearing section spaced from said fixed location bolt aperture.

5. The shovel according to claim 2 in which said bolt means including at least one fixed location bolt aperture formed through said central area and at least one elongated bolt aperture formed through said central area spaced from said fixed location bolt aperture.

6. The shovel according to claim 1 which includes wings projecting from opposite longitudinal bolts of said elongated shovel, adjacent a bottom end thereof.

7. The shovel according to claim 5 which includes wings projecting from opposite longitudinal edges of said elongated shovel, adjacent a bottom end thereof.

8. A high centre shovel comprising an angulated length of steel which includes a pair of side flanges each extending from a common longitudinal apex at an included angle one with the other and providing a V-shaped cross-section, unconstricted along an open rear side of the shovel, means to detachably secure said shovel to an associated shank, said means including a recessed flattened bearing section intermediate the outer edges of said flanges and symmetrically located between said outer edges and spanning said apex and bolt apertures extending through said bearing section.

9. The shovel according to claim 8 in which said bearing section includes a corresponding recessed front surface upon the front side of said shovel.

10. The shovel according to claim 9 which includes a central area of said shovel being depressed during the forming thereof, the front side of said central area forming said flat front surface, the back side of said central area forming flat bearing surface.

11. The shovel according to claim 8 in which said bolt means includes at least one fixed location bolt aperture formed through said bearing section and at least one elongated bolt aperture formed through said bearing section spaced from said fixed location bolt aperture.

12. The shovel according to claim 9 in which said bolt means including at least one fixed location bolt aperture formed through said central area and at least one elongated bolt aperture formed through said central area spaced from said fixed location bolt aperture.

13. The shovel according to claim 8 which includes wings projecting from the opposite longitudinal edges of said elongated shovel, adjacent a bottom end thereof.

14. The shovel according to claim 12 which includes wings projecting from opposite longitudinal edges of said elongated shovel, adjacent a bottom end thereof.

15. The shovel according to claim 8 in which the included angle is between 80° and 120°.

16. The shovel according to claim 12 in which the included angle is between 80° and 120°.

* * * * *